United States Patent
Berry

(10) Patent No.: US 12,256,675 B2
(45) Date of Patent: Mar. 25, 2025

(54) IMPACT PROCESSING SYSTEM AND A MACHINE AND A METHOD OF IMPROVING NUT OR FRUIT ORCHARD HYGIENE

(71) Applicant: Seed Terminator Holdings Pty Ltd, Kingscote (AU)

(72) Inventor: Nicholas Kane Berry, Kingscote (AU)

(73) Assignee: Seed Terminator Holdings Pty Ltd, Kingscote (AU)

( * ) Notice: Subject to any disclaimer, the term of this patent is extended or adjusted under 35 U.S.C. 154(b) by 908 days.

(21) Appl. No.: 17/427,164

(22) PCT Filed: Feb. 5, 2020

(86) PCT No.: PCT/AU2020/050097
§ 371 (c)(1),
(2) Date: Jul. 30, 2021

(87) PCT Pub. No.: WO2020/160622
PCT Pub. Date: Aug. 13, 2020

(65) Prior Publication Data
US 2022/0132741 A1      May 5, 2022

(30) Foreign Application Priority Data
Feb. 5, 2019 (AU) .................. 2019900354

(51) Int. Cl.
*A01D 82/00* (2006.01)
*A01D 46/26* (2006.01)
*A01D 51/00* (2006.01)

(52) U.S. Cl.
CPC ............. *A01D 82/00* (2013.01); *A01D 46/26* (2013.01); *A01D 51/002* (2013.01)

(58) Field of Classification Search
CPC ....... A01D 82/00; A01D 46/26; A01D 51/002
See application file for complete search history.

(56) References Cited

U.S. PATENT DOCUMENTS 3,628,580 A * 12/1971 Langston ................. A23N 5/00
99/578
4,813,619 A   3/1989 Tjumanok et al.
(Continued)

FOREIGN PATENT DOCUMENTS

AU    7175996 A    5/1997
FR    2776468 A1   10/1999
(Continued)

OTHER PUBLICATIONS

International Search Report and Written Opinion for Application No. PCT/AU2020/050097 dated Apr. 23, 2020 (17 pages).
(Continued)

*Primary Examiner* — Abigail A Risic
(74) *Attorney, Agent, or Firm* — Michael Best & Friedrich LLP

(57) ABSTRACT

An impact processing system (10) having a central opening (12) enabling material flow into a primary impact zone (14) in which is located an impact mechanism (16) rotatable about a rotation axis (18). An impact structure (20) provided with a plurality of holes (22) surrounds the impact mechanism (16). The rotatable impact mechanism (16) impacts material entering the primary impact zone (14) from the central opening (12) and accelerate the impacted material in a radial outward direction toward the impact structure (20) to effect fragmentation of the impacted material so that when sufficiently fragmented the material is able to pass through the holes (22). An optional outer structure (30) is radially spaced from the impact structure (20) and may comprise one or more segments that cumulatively extend about the axis of rotation (18) for an angle from 30° and 270° inclusive. A rotatable set of impact members (50) may be located between the impact structure and the outer structure. One or more gaps (28) may be provided in the impact structure (20) to allow the passage of large and/or hard objects that cannot
(Continued)

otherwise be fragmented. The outer structure (30) is positioned to span across the gaps (28) so that material passing there thought is directed onto the outer structure (30).

18 Claims, 7 Drawing Sheets

(56) References Cited

U.S. PATENT DOCUMENTS

| | | | | |
|---|---|---|---|---|
| 5,001,893 | A | * | 3/1991 | Stanley ................ A01D 51/002 56/16.5 |
| 5,191,758 | A | * | 3/1993 | Cote ....................... A01D 46/26 56/329 |
| 5,373,688 | A | * | 12/1994 | Stanley ................ A01D 51/002 56/328.1 |
| 8,152,610 | B2 | | 4/2012 | Harrington |
| 10,952,376 | B1 | * | 3/2021 | Nichols ............... B02C 18/0084 |
| 2009/0038282 | A1 | | 2/2009 | Awalle et al. |
| 2011/0219627 | A1 | * | 9/2011 | Erickson ................. A47J 43/26 30/120.4 |
| 2013/0124239 | A1 | | 5/2013 | Rosa et al. |
| 2015/0373913 | A1 | | 12/2015 | Berry et al. |
| 2016/0029687 | A1 | * | 2/2016 | Berry ....................... A23N 5/00 426/482 |

FOREIGN PATENT DOCUMENTS

| | | |
|---|---|---|
| GB | 2047120 A | 11/1980 |
| WO | 2018053600 A1 | 3/2018 |
| WO | 2019178651 A1 | 9/2019 |

OTHER PUBLICATIONS

International Preliminary Report on Patentability for Application No. PCT/AU2020/050097 dated Jun. 4, 2021 (9 pages).

* cited by examiner

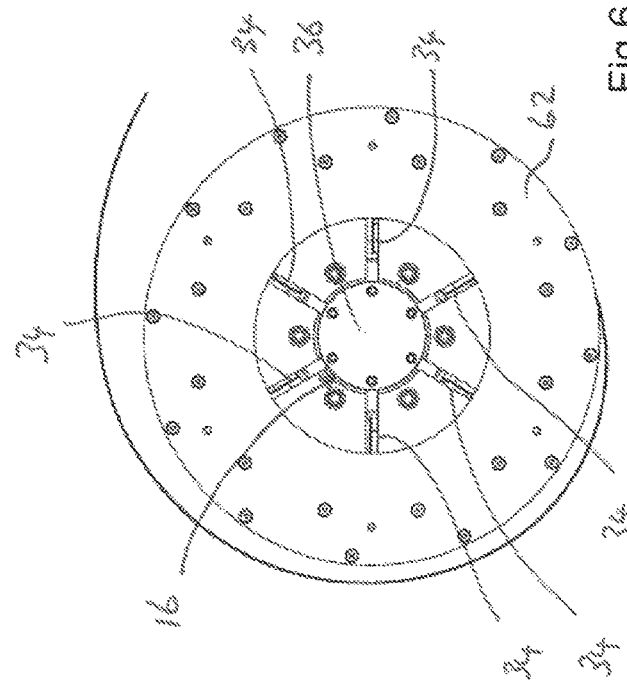
Fig 6
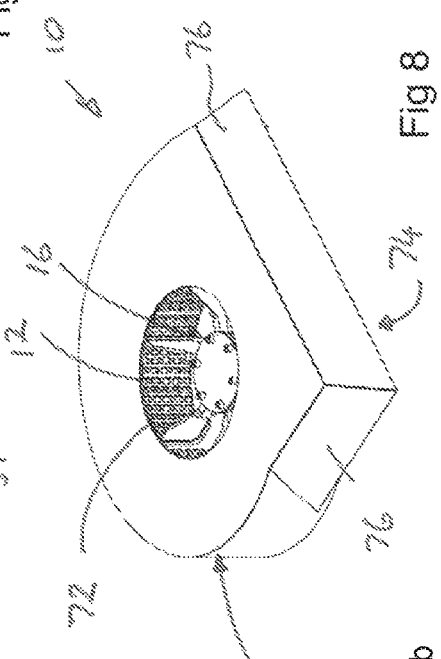
Fig 8
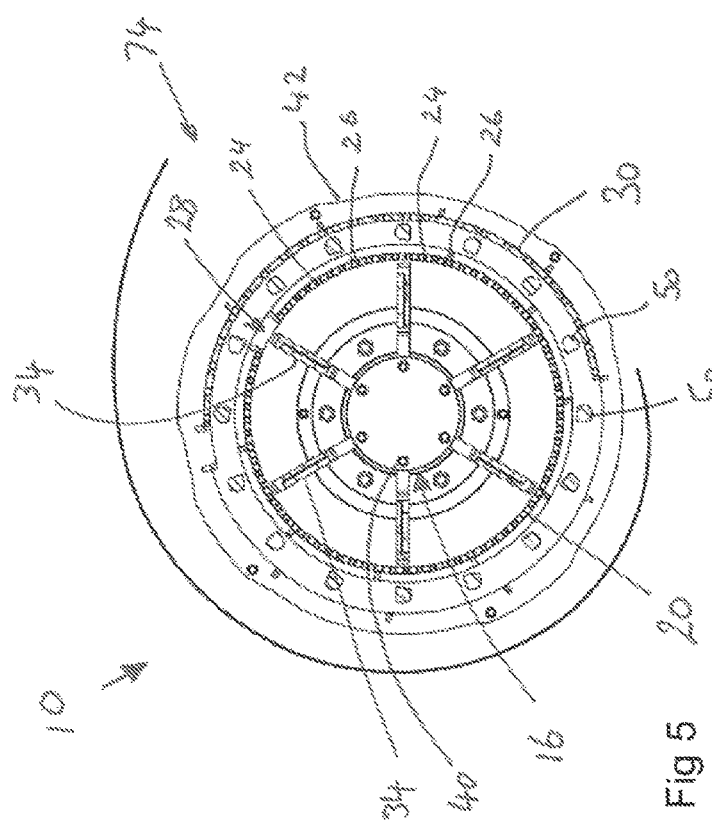
Fig 5
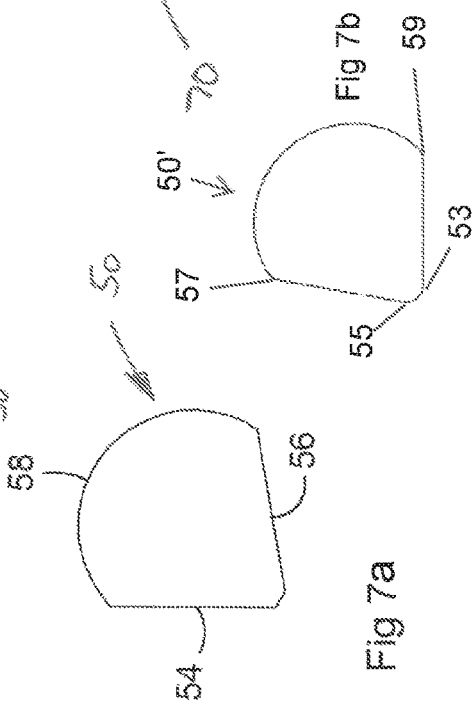
Fig 7a
Fig 7b

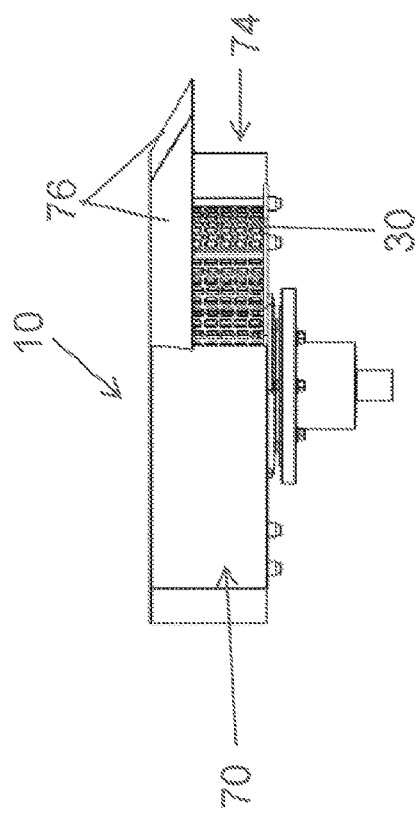
Fig 10
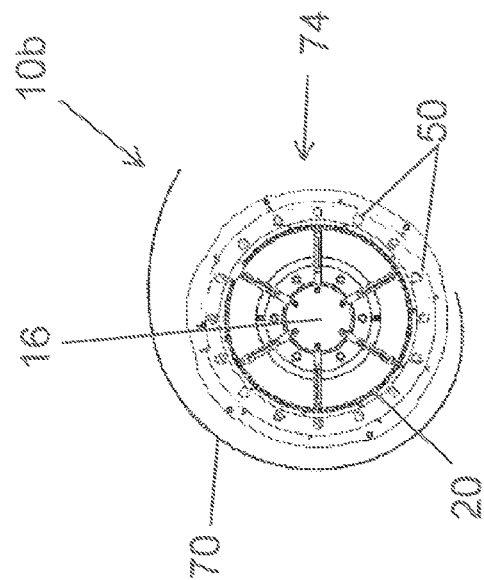
Fig 11b
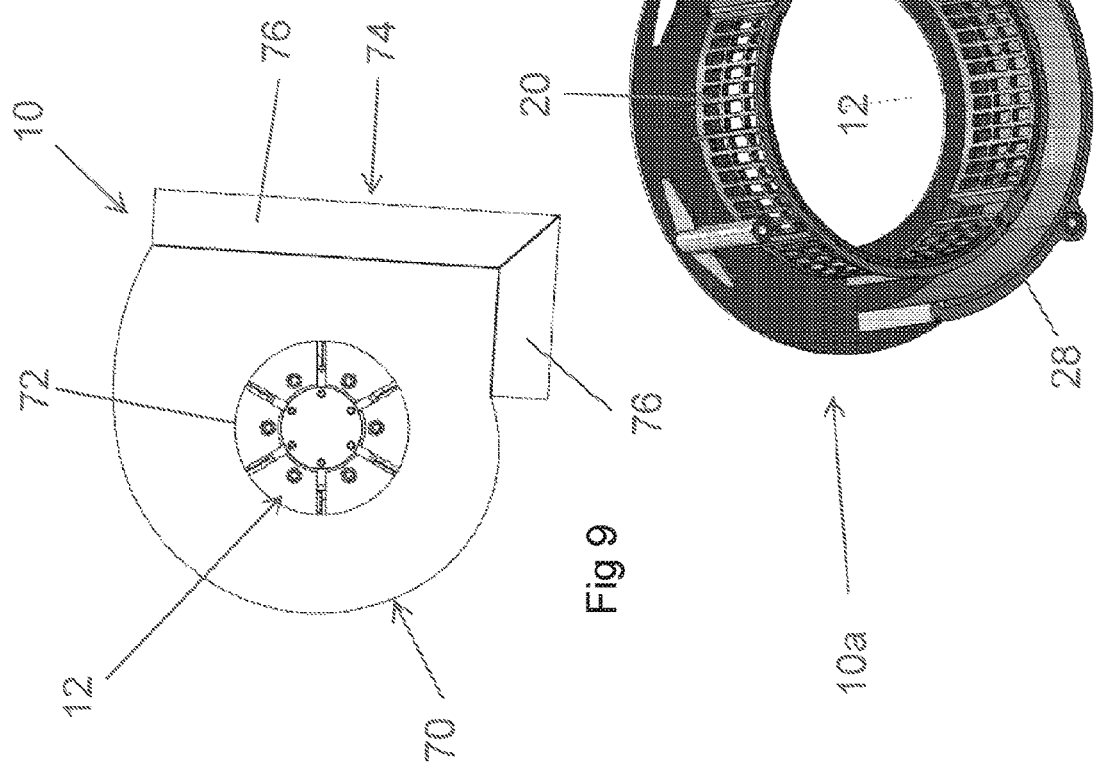
Fig 9
Fig 11a

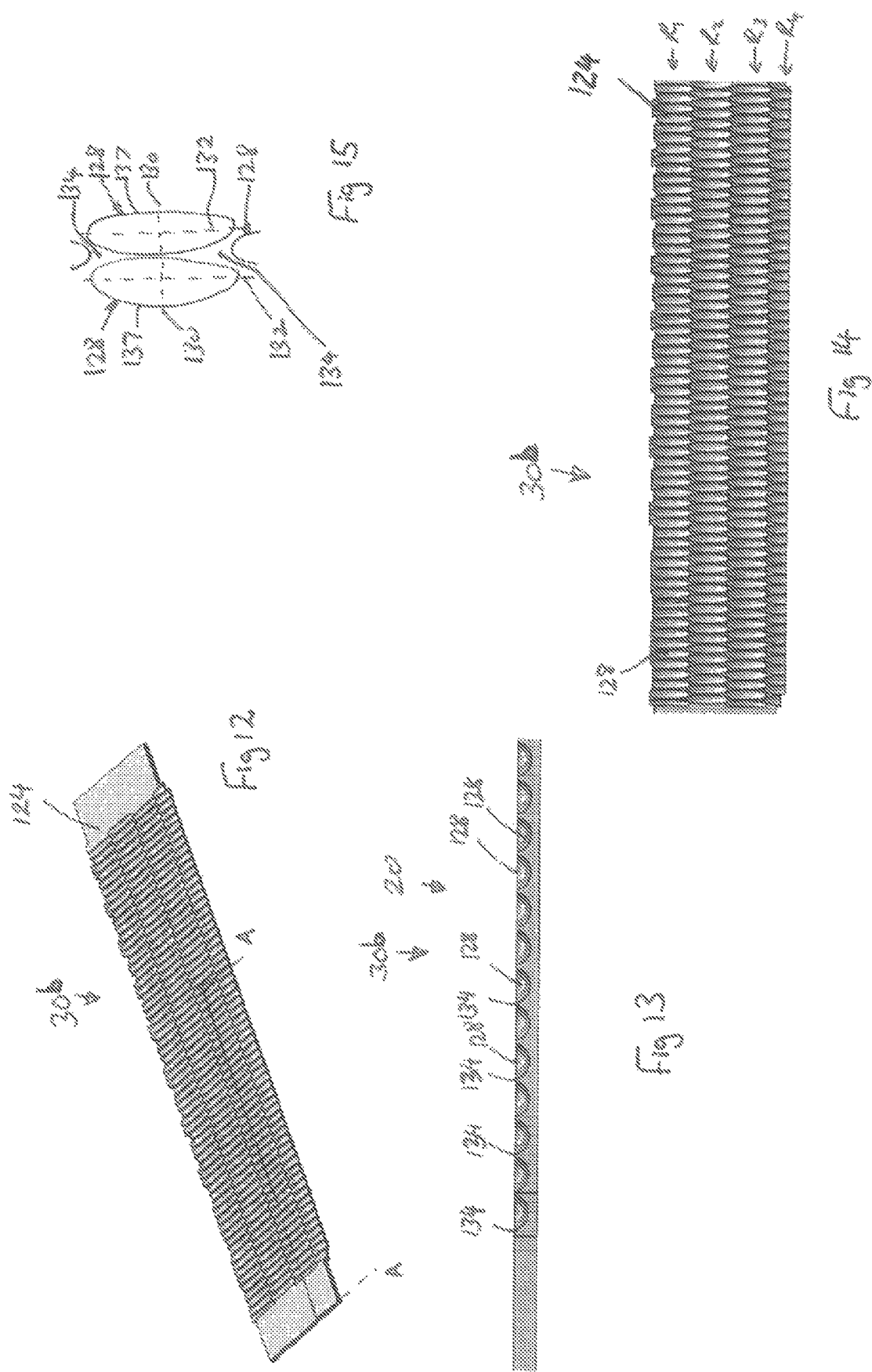

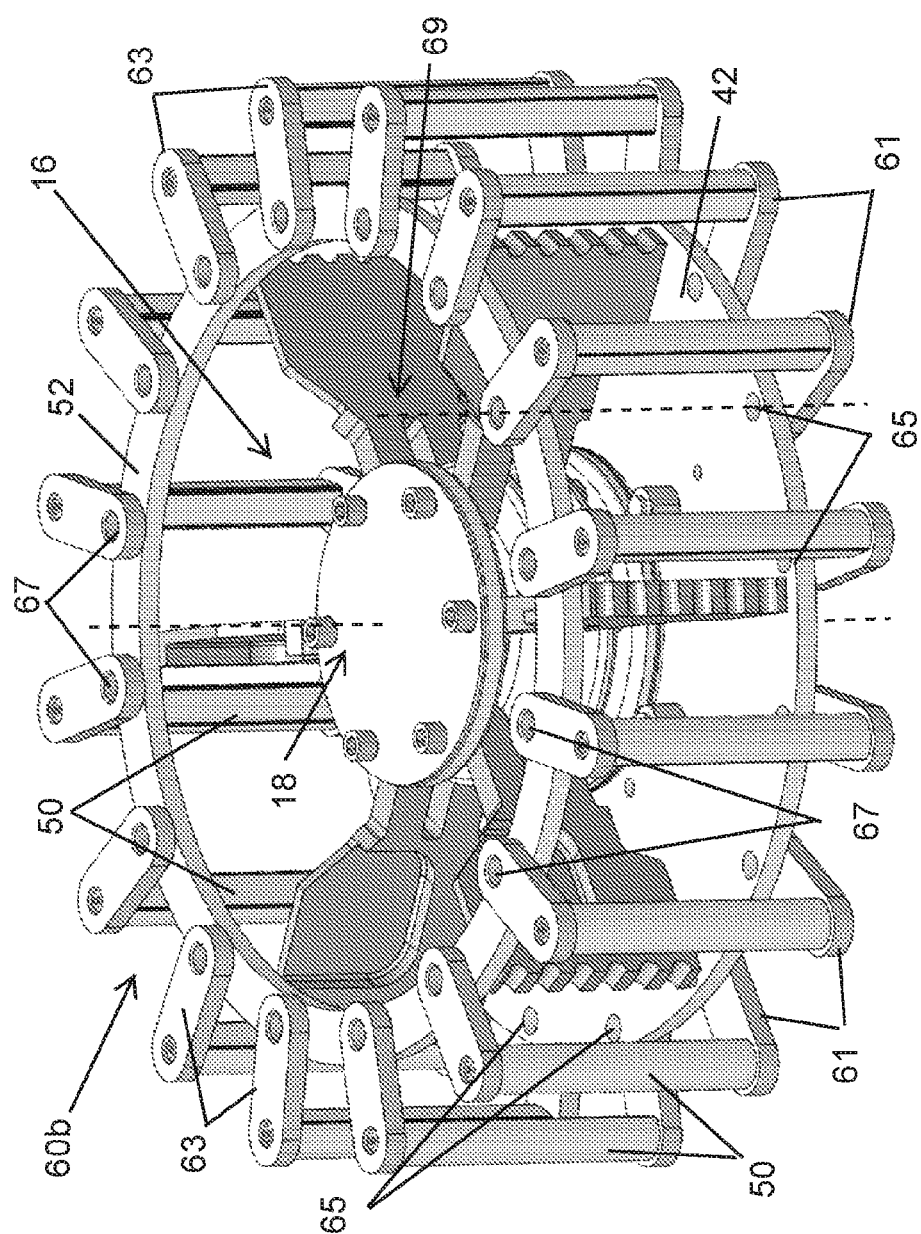

IMPACT PROCESSING SYSTEM AND A MACHINE AND A METHOD OF IMPROVING NUT OR FRUIT ORCHARD HYGIENE

TECHNICAL FIELD

An impact processing system of a type suitable for the devitalisation and/or fragmentation of organic matter is disclosed. Also disclosed is a machine and a method of improving nut or fruit orchard hygiene. This method may incorporate use of the disclosed impact processing system, or another type of impact processing system, to devitalise and/or fragment organic matter found in the orchard.

BACKGROUND ART

Impact mills use high impact speeds generated by rotating elements to pulverise material. The ability to pulverise material has seen the application of impact mills in agriculture for the termination of weed seeds at harvest. This assists in minimising use of herbicides which is considered beneficial to the overall ecosystem.

A widely used type of impact mill is a hammer mill, which uses a rotor with impact elements to pulverise material and a screen to classify the output size distribution. Impact mills are highly versatile and can accept a wide range of feed materials. Plant material such as crop residues is fibrous and difficult to process. The use of impact mills to devitalise weed seeds in crop residues has been well documented. The use of impact mills on board a harvester to devitalise weed seeds has been subject of multiple patents (e.g. Wallis (1995) AU1996071759; Bernard (1998) FR2776468B1).

A significant problem the Almond industry in Australia is the economic damage caused by the Carpophilus beetle. The beetle is causing widespread damage to the almonds resulting in downgrading of up to 30% of the crop to manufacturing grade. There is a need to implement an integrated strategy to control the beetle.

Beetle trapping is being investigated using pheromone and co-attractant, but the method is not verified for effectiveness. Orchard hygiene has a major impact on beetle numbers over winter months. Mummy nuts (nuts left after harvest is complete) provide food and shelter for the beetle between crops. The beetle is able to breed-up using the mummy nuts and then attack the following crop. This has prompted many almond producers to re-shake trees and row the almonds. Either removing the almonds from the orchard completely or try and destroy them in the orchard.

Orchard hygiene is very important across a range of other fruit and nut industries.

The presently disclosed apparatus and method have arisen through consideration of the above described issue facing the almond industry and subsequent research and development of mechanical devices that may alleviate such issues. However, the resultant disclosed system, machine and method are not limited in application to the almond industry and have much broader application in the field of orchard hygiene.

The above references to the background art do not constitute an admission that the art forms a part of the common general knowledge of a person of ordinary skill in the art.

SUMMARY OF THE DISCLOSURE

In one aspect there is disclosed an impact processing system comprising:

a central feed opening enabling material flow into a primary impact zone of the impact processing system;

an impact mechanism disposed in the primary impact zone and arranged to be rotatable about a rotation axis;

an impact structure disposed about the impact mechanism the impact structure being provided with a plurality of holes; and the rotatable impact mechanism being arranged to impact material entering the primary impact zone from the central opening and accelerate the impacted material in a radial outward direction toward the impact structure to effect fragmentation of the impacted material wherein the fragmented material is able to pass through the holes in the impact structure.

In one embodiment the impact processing system further comprises:

an outer structure arrangement radially spaced from the impact structure wherein the outer structure comprises one or more segments wherein the one or more segments cumulatively extend about the axis of rotation for any angle from 30° and 270° inclusive.

In one embodiment the impact structure is provided with one or more gaps dimensioned to enable passage of incompressible objects or impacted material too large to otherwise pass through the holes in the impact structure.

In one embodiment the outer structure is located so that material passing through the one or more gaps impacts the outer structure.

In one embodiment the outer structure comprises a single segment extending about the axis of rotation for an angle of between 30° and 270°.

In one embodiment the outer structure comprises a plurality of segments each segment located in radial alignment with a gap in the impact structure wherein material passing through a gap in the impact structure impacts a corresponding segment.

In one embodiment the impact structure is provided with a single gap and the outer structure extends for an angle of about 180°.

In one embodiment the impact processing system comprises a rotatable set of impact members arranged outside of the impact structure wherein at least a proportion of the material passing through the holes or gaps of the impact structure are impacted by and/or accelerated in a radial outer direction by the set of impact members.

In one embodiment the impact members comprise bars or rods arranged to pivot relative to the axis of rotation.

In one embodiment impact the processing system comprises a plate on which the impact mechanism and the set of impact members are coupled.

In one embodiment the impact processing system comprises arms pivotally coupled to the plate and wherein each impact member is connected to a respective arm.

In one embodiment the set of impact members is located between the impact structure and the outer structure.

In one embodiment the impact structure comprises a first screen arrangement.

In one embodiment the outer structure comprises a second screen arrangement.

In one embodiment the impact processing system comprises a material containment and outlet arrangement disposed about the impact structure and configured to deflect or direct material accelerated in a radial outward direction to be discharged in an arc in the range of about 270° to about 180° about an axis of rotation of the impact mechanism.

In one embodiment the material containment and outlet arrangement has an inlet through which material can enter the central feed opening and an outlet through which the fragmented material is discharged and wherein the outer structure spans an arc at least co-extensive with the outlet.

In one embodiment the rotatable impact elements are arranged to generate an airflow in a radial direction outward from the rotation axis.

In a second aspect there is disclosed a machine for improving nut or fruit orchard hygiene comprising:
  a mechanism for mechanically transferring nuts or fruit from an orchard ground or tree on which the nuts or fruit grow to a processing system;
  wherein the processing system is operable to fragment or otherwise pulverise the nuts or fruit.

In one embodiment the processing system comprises the processing system according to the first aspect.

In one embodiment the machine comprises a power source enabling the machine to be self-propelled across the ground and wherein the processing system is traversed along the ground while the nuts or fruit are transferred to the processing system.

In one embodiment the processing system is coupled to the power source enabling the processing system to process the nuts or fruit.

In one embodiment the mechanism system is arranged to receive power from a powered vehicle used to tow the machine.

In one embodiment the machine comprises a transmission system enabling power from the powered vehicle to be transmitted to the processing system.

In a third aspect there is disclosed a method of improving nut or fruit orchard hygiene comprising:
  mechanically transferring nuts or fruit from an orchard ground or tree on which the nuts or fruit grow to a processing system;
  operating the processing system to fragment or otherwise pulverise the nuts or fruit;
  wherein the processing system is traversed along the ground while the nuts or fruit are transferred to the processing system.

In one embodiment the method comprises depositing the nuts or fruit onto the ground after passage through the processing system.

In one embodiment the method comprises mounting the processing system on a machine wherein the machine comprises a mechanism to mechanically transfer the fruit or nuts to the processing system; and transmitting power from the machine to the processing system to enable operation of the processing system.

In one embodiment transmitting power comprises mechanically or hydraulically coupling a power source of the machine to the processing system.

In one embodiment the method comprises mounting the processing system on a machine wherein the machine comprises a mechanism to mechanically transfer the fruit or nuts to the processing system; and towing the machine and the processing system behind a vehicle.

In one embodiment the method further comprises and either (a) transmitting power from the vehicle to the processing system to enable operation of the processing system; or (b) providing an independent power source on the vehicle to enable operation of the processing system.

In one embodiment mechanically transferring the nuts comprises picking up fruit or nuts off the ground.

In one embodiment mechanically transferring the nuts comprises shaking and catching fruit or nuts from a tree.

In one embodiment the method is applied to almonds.

In one embodiment the processing system is an impact processing system according to the first aspect.

In a fourth aspect there is disclosed an impact processing system comprising:
  an impact mechanism disposed in the and arranged to be rotatable about a rotation axis;
  an impact structure disposed about the impact mechanism the impact structure being provided with a plurality of holes and forming a primary impact zone;
  the rotatable impact mechanism being arranged to impact material entering the primary impact zone and accelerate the impacted material in a radial outward direction toward the impact structure to effect fragmentation of the impacted material wherein the fragmented material is able to pass through the holes in the impact structure; and
  a rotatable set of impact members arranged outside of the impact structure wherein at least a proportion of the material passing through the holes or gaps of the impact structure are impacted by and/or accelerated in a radial outer direction by the set of impact members, wherein the impact members are arranged to pivot relative to the axis of rotation.

In one embodiment the impact processing system comprises a plate on which the impact mechanism and the set of impact members are coupled.

In one embodiment the impact processing system comprises arms pivotally coupled to the plate and wherein each impact member is connected to a respective arm.

In one embodiment the impact processing system comprises an outer structure radially spaced outwardly from the rotatable set of impact members wherein the outer structure comprises one or more openings through which material impacted by the rotatable set of impact members can pass.

In one embodiment the outer structure comprises one or more segments wherein the one or more segments cumulatively extend about the axis of rotation for any angle from 30° and 270° inclusive.

In one embodiment the impact processing system comprises an outer structure radially spaced outwardly from and extending about the rotatable set of impact members wherein the outer structure comprises an impervious surface toward which material impacted by the rotatable set of impact members is accelerated.

In a fifth aspect there is disclosed rotor for a material processing system the rotor having an axis of rotation, the rotor comprising: a plate;
  an impact mechanism mounted on the plate coaxial with the axis; and
  a plurality of impact members pivotally coupled to the plate and arranged in a spaced about manner about the axis.

In one embodiment the rotor comprises arms pivotally coupled to the plate and wherein each impact member is connected to a respective arm.

BRIEF DESCRIPTION OF THE DRAWINGS

Notwithstanding any other forms which may fall within the scope of the impact processing system, machine and method as set forth in the Summary, specific embodiments will now be described, by way of example only, with reference to the covering drawings in which:

FIG. 5 is a section view of the disclosed impact processing system in a first radial plane;

FIG. 6 a section view of the disclosed impact processing system in a second radial plane;

FIG. 7a is a section view through one of the impact elements shown in FIGS. 1 and 4;

FIG. 7b is a section view through an alternate form one of the impact elements shown in FIGS. 1 and 4;

FIG. 8 is a perspective view of the disclosed impact processing system;

FIG. 9 is a plan view of the disclosed impact processing system;

FIG. 10 is a side view of the disclosed impact processing system;

FIG. 11a is a representation of a second embodiment of the disclosed processing system;

FIG. 11b is a representation of a third embodiment of the disclosed processing system FIG. 12 is a schematic representation of an outer structure that may be incorporated in a fourth embodiment the disclosed processing system, where the outer structure is shown in a laid flat configuration;

FIG. 13 is a view of section AA of the outer structure shown in FIG. 12;

FIG. 14 is a plan view of a portion of the outer structure shown in FIG. 12;

FIG. 15 is an enlarged view of a valley provided in the outer structure;

FIG. 17 is a representation of yet another form of rotor structure that may be incorporated in another embodiment of the disclosed impact processing system.

DETAILED DESCRIPTION OF SPECIFIC EMBODIMENTS

Figure 2:
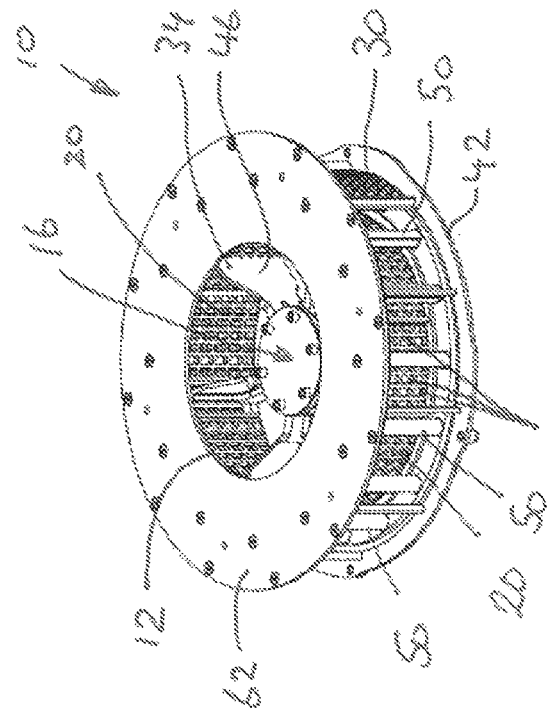
FIG. 2 is a perspective view from a second angle the impact mechanism, impact structure and impact elements incorporated in an embodiment of the disclosed impact processing system.

Various embodiments of an impact processing system and a machine for and a method of improving nut or fruit orchard hygiene are disclosed in this specification. Each of the disclosed impact processing systems may be used with the disclosed machine and method. However, the machine and the method are not limited to only using the disclosed processing system. The machine and the method may use other processing systems including prior art processing systems or mills.

FIGS. 1-10 depict a first embodiment of the disclosed impact processing system 10 (hereinafter referred to in general "system 10"). The processing system 10 may be considered to form a mill or more particularly a hammer mill in view of its general action and structure. However, the system 10, depending on its application need not process the feed material to the extent of milling to a fine particle size. In some applications and indeed an application of devitalising material such as fruits and nut, the intended effect of devitalisation may be achieved by smashing or fragmenting the fruits/nuts into relatively speaking large particle size. This is to be contrast for example when devitalising weed seeds which are of a much smaller size fruit or nuts. Nevertheless, the disclosed system 10 may be used for processing material to various degrees of fineness for devitalisation including milling of materials. Due to this wide application, the terminology "system", or "processing system" or "impact processing system" is predominately in this specification. However, this is intended to include within its scope a mill or hammer mill, or impact hammer mill.

The system 10 has a central feed opening 12 enabling material flow into a primary impact or destruction zone 14. An impact mechanism 16 is in the primary impact zone 14 and is capable of rotating about a rotation axis 18. The impact mechanism 16 is arranged to impact the material entering the primary impact zone 14 and accelerate the impacted material in a radial outward direction. The system 10 has an impact structure 20 disposed about the impact mechanism 16 and forms a boundary of the primary impact zone 14. The impact structure 20 in this embodiment is stationary and thus may be considered to be or referred to as a stator, or impact stator. The structure 20 has a plurality of holes or gaps 22 through which impacted material of a first size range can pass. In this illustrated embodiment the impact structure is a screen or screen arrangement 20 having a plurality of holes 22. However, in other embodiments the impact structure may take other forms such as for example a plurality of impact elements such as bars, rod or thin plates arranged in a spaced apart manner about the impact mechanism 16 and axis 18. In these other embodiments the space between the impact elements acts the holes or gaps 22 through which fragmented material can pass.

In this embodiment of the impact structure 20 is formed from a number of arcuate segments 24 (see FIGS. 3 & 5) located side-by-side. A plurality of axially extending supporting ribs 26 is provided immediately behind each of the segments 24 in the radial direction. When the impact structure 20 is a screen arrangement then the segments 24 are screen segments. The ribs 26 are evenly spaced circumferentially about the impact structure 20. However, in an alternate embodiment it is envisaged that the impact structure 20 may be formed as a single rectangular mesh which is curved, rolled, folded or otherwise formed to extend substantially circumferentially about the axis 18. In this embodiment the ribs 26 may be attached to the rectangular mesh prior to fitting into the system 10.

Figure 3:
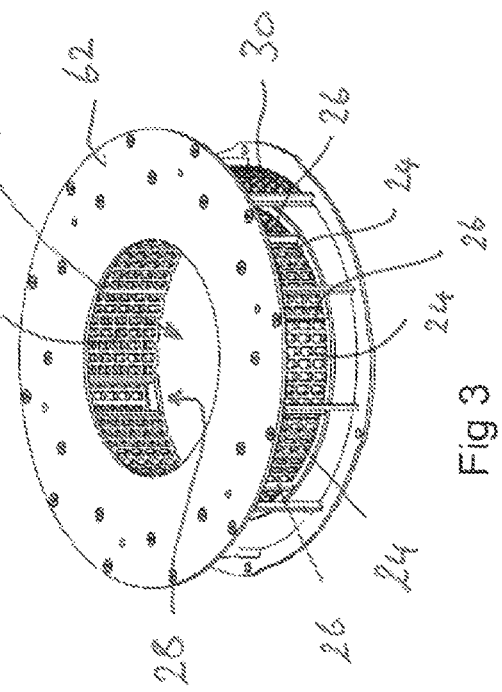
FIG. 3 is a perspective view from the first angle of the impact structure shown in FIG. 1.

As shown in FIGS. 3 and 5 the impact structure 20 may be formed with an optional opening or gap 28. The opening/gap 28 is are dimensioned to enable the passage of impacted material that is too large to otherwise pass through the holes 22. Such material maybe a foreign object. This assists in minimising the build-up of oversized or foreign material within the primary impact zone 14 that may otherwise reduce the throughput of material through the system 10, or due to its physical nature cannot be fragmented and therefore may damage the system 10. Examples of such material that may be found in an orchard and picked up with nuts or fruit from the ground may include a twig, stone or small metal article such as a nut, bolt, or piece of wire. It should be understood however that the impact structure 20 may also be formed without any opening/gap 28. It is also possible to have more than one opening/gap 28.

The system 10 may also be provided with an outer structure 30. The outer structure 30 may take many different forms including: a screen arrangement 30 of a general structure similar to the first screen arrangement 20; or, an impervious surface (i.e. a surface that is continuous or solid or otherwise does not have any holes or gaps through which material can pass). When in the form of an impervious surface the surface may be smooth or textured. The outer structure 30 is provided for directing the material that has passed through the impact structure 20 toward the system outlet 74. Additionally, when the impact structure 20 is provided with the large openings/gaps 28 the outer structure 30 acts to decelerate the material that passes through the openings 28 prior to being discharged from the system 10. In one embodiment as shown in FIG. 5 this functionality of the outer structure 30 is realised by having it span across the opening 74 and the opening 28. In this way no material of a size that is only able to pass through the openings 28 can travel from within the primary impact zone 14 to the outlet 74 without contacting either the outer structure 30 or an inner wall of a housing 70 which houses the impact mechanism 16 and forms the outlet 74. In the present embodiment the system 10 has an impact structure 20 with a single opening 28 that is radially spaced form and circumferentially spanned by the outer structure 30.

The outer structure 30 may also enable further processing of material that passes through the openings/gaps 28. Accordingly, the outer structure 30 may be located so that it is likely to be impacted by material passing through the gaps 28. This may be achieved for example by forming the outer 28 structure so that it extends about the axis of rotation 18 for an angle of between 30° and 270°, for example 180° as shown in the currently illustrated embodiment. In any event whether or not the impact structure 20 is provided with the openings/gaps 28, in embodiments of the system 10 the outer structure 30 either as a single structure/segment or as two or more segments may extend cumulatively for any angle between 30° and 270° inclusive. In this regard it is believed to be beneficial for the outer structure 30 to not completely encircle the impact structure 20 and thereby leave a reasonable sized gap (for example 90° to 330° about the outside of the impact structure arrangement 20) to assist in enabling sticky material for example derived from nuts and fruit to be readily cleared out of the system 10. This clearing may be done manually but also at least in part automatically by designing reasonable sized gap(s) that provide the material with higher exit velocity due to the absence of the full circumferential outer structure, and a less restricted air flow.

For ease of description of the current embodiment illustrated in FIGS. 1-10 the outer structure 30 will be referred to hereinafter as "the second screen arrangement 30".

The second screen arrangement 30 may be made from a single rectangular mesh screen which is curved, rolled, folded or otherwise formed for fitting into the system 10, or it may be formed from a plurality of curved segments installed about the first screen arrangement 20. If the first screen arrangement 20 is formed with more than one gap 28, the second screen arrangement/outer structure 30 may be provided as one or more separate segments each being radially aligned with and circumferentially extending on opposite sides of a corresponding gap 28. In such an embodiment it remains desirable that cumulatively, the screen/outer structure 30 segments extend about the axis of rotation 18 for an angle of between 30° to 270°.

The second screen arrangement 30 whether provided as a single structure or a plurality of segments is formed with holes 32. The holes may be of the same or different size as the holes 22 in the first screen arrangement 20. In the illustrated embodiment the holes 32 are shown to be larger than the holes 22. The reasoning behind this is that the second screen arrangement 30 is provided for material that is not easily fragmented into particles of a size able to pass through the holes 22 and moreover reaches the second screen arrangement 30 via the larger sized caps 28. However, it may be possible for a portion of such material to be fragmented to particle size sufficient to pass through the holes 32.

Figure 4:
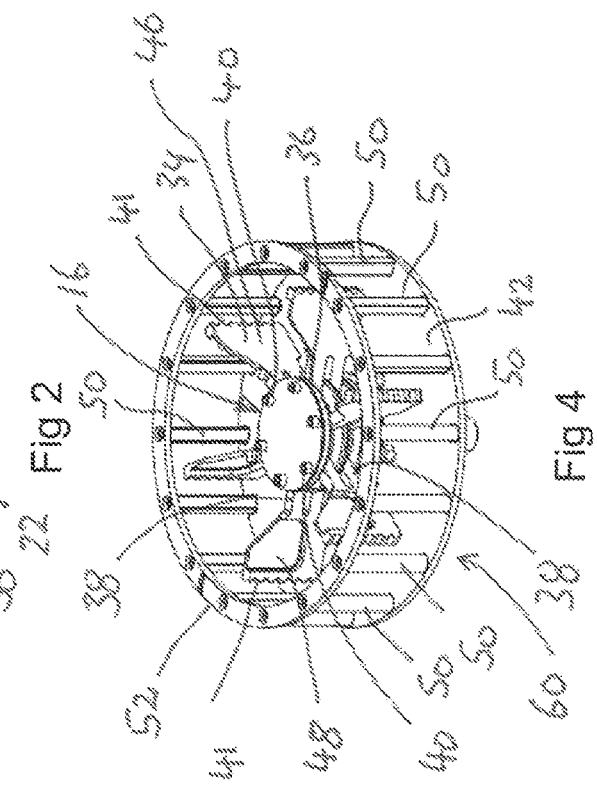
FIG. 4 is a perspective view of the impact mechanism and impact elements shown in FIG. 1.

FIGS. 4, 5 and 6 show one possible form of impact mechanism 16 that may be incorporated in the system 10. The depicted mechanism 16 is provided with a plurality (in this instance six) radially extending elements in the form of flails or hammers 34. Each hammer 34 is coupled to a common central hub 36 which rotates about the rotation axis 18. The hammers 34 are pivotally coupled about respective bolts or pins 40 to the hub 36. This enables the hammers 34 to swing if impacted by a hard foreign object which enters the impact zone 14 to minimise the likelihood of major damage. A hard foreign object, if not fragmented into pieces small enough to pass through the holes 22, will eventually exit through one of the gaps 28. In this, but not all embodiments, the hammers 34 are provided with bifurcated arms 38.

Each hammer 34 has an outer axial edge 41 which extends for a length marginally smaller than the depth of the impact zone 14. This enables the provision of a small clearance between the upper and lower radial edges of the hammers 34 and a bottom surface of the impact zone 14 formed by base plate 42.

The axial edge 40 is formed with a plurality of spaced apart grooves of flutes 44 the purpose of which is to assist in fragmenting elongated material such as straw that may enter the feed opening 12 as well as reduce smearing of material on the screen arrangement 20. An impact side 46 of the hammers 34 is substantially planar and lies in the axial plane. A trailing face 48 of the hammers is scalloped. The purpose of this is to balance the impact mechanism 16 in any radial plane. In this regard the hammers 34 extend in an axial direction higher than the hub 36. In the absence of the scalloping the centre of gravity of the impact hammers 34 would be axially offset from the centre of gravity of the hub 36 which may lead to instability together with increased bearing wear and heat generation.

In other embodiments a much simpler impact mechanism 16 can be used in which for example the hammers do not pivot on the hub but are fixed, i.e. do not act as flails. Also, the hammers may have a single arm rather than bifurcated arms. The axial edge of the hammers may not be grooved or fluted, but straight instead. The hammer head may be a simple rectangular plate of hard material, planar on both sides, perhaps with rounded edges and held by a single arm. So, the illustrated impact mechanism 16 may be replaced by a simple paddle like mechanism. The combination of the impact mechanism 16 and the impact structure/screen arrangement 20 forms a first milling stage of the processing system 10.

Figure 1:
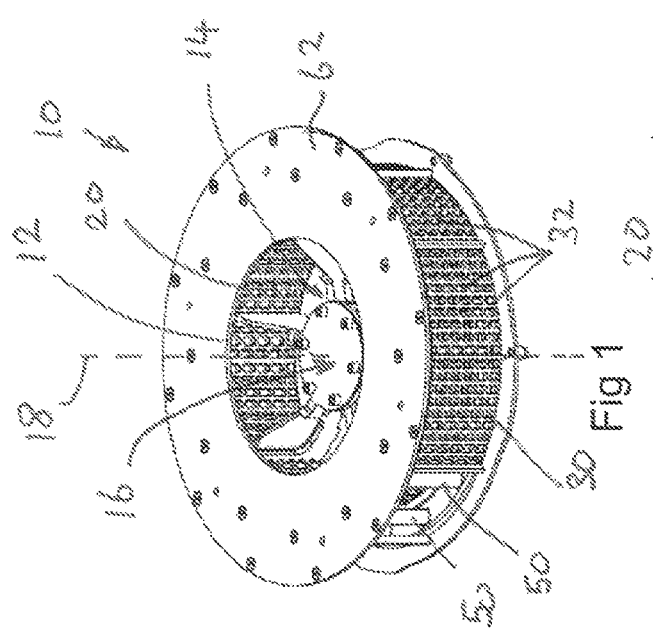
FIG. 1 is a perspective view from a first angle of one form of impact mechanism, impact structure and impact elements incorporated in an embodiment of the disclosed impact processing system.

As can be seen from FIGS. 1, 2 and 4 the processing system 10 may also be provided with a rotatable set of impact members 50 arranged about a radial outer side of the first screen arrangement 20. The set of impact members 50, when provided, are located between the first screen arrangement 20 and the second screen arrangement 30. At least a proportion of the material passing through the holes 22 of the first screen arrangement 20 is impacted by and accelerated in a radial outward direction by the rotating set of impact members 50. The rotating impact members 50 also act to produce an airflow in a radial outward direction inducing material to flow in a radial outward direction from the rotation axis 18 and discharged through an outlet opening of the system 10. The elements may be rigid, for example by being made of metal, or have a degree of flexibility.

The impact members 50 in this embodiment are evenly spaced apart in the circumferential direction thus forming corresponding circular arrays of impacts members. A lower end of each of the impact elements 50 is fixed the base plate 42. An upper end of each of the impact elements 50 is attached to a ring 52.

As shown on FIGS. 1 and 7a, each impact element 50 has a first flat surface 54 that lies parallel to the radial direction of the system 10. However, in other embodiments the first flat face 54 may lie within 20° degrees to a radial direction of the system 10. Each impact element 50 also has on its radial inner side a second flat face 56 that joins, and forms an acute included angle with, the flat surface 54. A curved (i.e. non-linear) surface 58 extends between the flat faces 54 and 56.

FIG. 7b shows one possible variation in the configuration of the impact element 50' in which the sharp corners of the elements 50 are replaced with chamfered corners 53, 55, 57 and 59. This results in an almost smooth radius transition between flats and rounds on the element 50'. This serves to: (a) improve the aerodynamics of the bars thereby reducing turbulence and reducing the power needed to run the system 10 empty; and (b) it allows hard facing (such as tungsten carbide HVOF) to improve durability—sharp edges in the substrate may otherwise form weak points of the coating.

The hub 36 and thus the central impact mechanism 16 are fixed to the base plate 42. Thus, the impact mechanism 16 and the impact elements 50 a driven together. When the impact elements are rotating about the rotation axis 18 the first flat face 54 is a leading face of the impact element 50 and provides for improved impact speeds. The curved surface 58 is a trailing surface and helps in reducing drag and turbulence. The second flat face 56 being at the acute angle relative to the first flat face 54 minimises sidewall impact of material moving radially outwards. This assists in improving airflow and material flow capacity.

The entire assembly of the base plate 42, impact elements 50 and impact mechanism 16 may form a replaceable unit. Additionally, the flails or hammers 34 can be individually replaced by decoupling from the central hub 36. Also, individual impact elements 50 or separate complete arrays of arrays of impact elements 50 may be replaceable.

The combination of the impact mechanism 16 and the impact elements 50 which are both attached to the base plate 42 form a rotor structure 60. The impact structure/first screen arrangement 20 and, the outer structure/second screen arrangement 30 are fixed to an annular plate 62 that lies parallel to the base plate 42. The combination of the screen arrangements 20, 30 and the new plate 62 forms a structure 64. In some embodiments this is a stator, i.e. a stationary structure. However, it is envisaged that in some embodiments it is possible to also in part torque to the structure 64 to cores to rotate about the axis 18.

The shape and configuration of the impact element 50 is not critical to the disclosed system 10 and therefore can be varied form that shown in the present Figures and described above. For example, the form of the elements 50 may be simplified to be simple bars of either a circular or rectangular cross sectional shape. Or they may have generally rectangular cross section with a convexly curved or otherwise rounded face on one side or indeed on two opposed sided. In another variation instead of solid bars the impact elements may be made of a plate which is shaped such as by roll forming or bending to have a particular profile for example a C or U shaped profile. If the profile results in the element forming a cavity or recess such as with the C or U shape, the opening of the profile may be arranged to face outwardly of the system 10. When used with the pivoting arms 61 or 61 and 63, this outward orientation would be when the arms are radially disposed relative to the rotation axis 18.

The system 10 includes a material containment and outlet arrangement in the form of a housing 70 (FIGS. 8-10) that extends about the plates 42 and 62 outer most screen and is formed with an inlet opening 72 in registration with the central inlet opening 12, and an outlet 74 for discharging the milled material. The outlet 74 may span an arc in the range of about 270° to about 180° about an axis of rotation of the impact mechanism. For example, in the illustrated embodiment this angle is about 120° The housing 70 converts the pressure generated by the rotor structure 60 into velocity at the outlet 74. Material exits the impact mill through the outlet 74 and is spread by the air flow generated initially by rotor structure 60. The second screen arrangement spans an arc at least co-extensive with the outlet 74. The housing 70 is also formed with deflector plates 76 that extend across the outlet 74 and are inclined in a direction from the plate 62 toward the plate 42. The deflector plates 76 act to deflect the material exceeding the outlet 14 in a downward direction toward the ground. Optionally the material could be directed to one or both sides of the machine. Or the material could be directed straight onto the ground with a rubber or fabric curtain.

The general operation of the system 10 is as follows. Material enters through the feed opening 12 and flows in the radial direction by airflow generated by the impact mechanism 16. While in the primary impact zone 14 the material is accelerated by the hammers 34 and undergoes sheer, crushing, impact and attrition forces between the impact structure/screen arrangement 20 and the hammers 34 multiple times. When the material is small enough it passes through the holes 22; or, if the material is not or cannot be fragmented to a size to pass through the holes 22, it can pass through one of the gaps 28 if and when provided. From here the material may be impacted and accelerated by the rotating set of impact members 50 if they are provided. In that event or otherwise the material is accelerated in the radial outward direction toward the inside of the housing 70.

When the gaps 28 and a second screen arrangement 30 are provided, material passing through the gaps 28 is directed toward the second screen arrangement 30 and then impacted and accelerated by the rotating impact members 50. This material may be fragmented to produce one or more particles that can pass through the holes 32 in the second screen arrangement 30, otherwise it this material is eventually swept out by and accelerated toward the inside surface of the housing 70 by the action of the rotating impact members 50.

Substantially all material initially entering the inlet 12 is discharged through the outlet 74. As explained further below it is envisaged that the system 10 will be coupled with a machine that mechanically transfers fruit or nuts from an orchard ground or indeed from a tree. As this machine is traversed along the ground system 10 will deposit the milled material exiting from the outlet 74 onto the ground.

FIG. 11a depicts a second embodiment of the disclosed system which is designated as 10a. The same reference numbers used in describing the first embodiment of the system 10 shown in FIGS. 1-10 are used to designate the same or substantially the same features in the system 10*a*.

The substantive difference between the system 10 and the system 10*a* is that in the system 10*a* the outer structure 30*a* is in the form of a continuous or solid surface (i.e. a surface without any holes through which material can pass) rather than a screen structure 30 as shown in the embodiment in FIGS. 1-3, 5 and 10. While the outer structure 30*a* is shown as extending for approximately 180° about the axis of rotation its circumferential extent may vary in different embodiments in the same manner as described above in relation to the screen structure 30. Although not shown, the system 10*a* may also be provided with a rotatable set of impact members of the same or similar structure, operation and function as the members 50 shown in FIGS. 4 and 5, located between the first screen arrangement 20 and the outer structure 30*a*.

In a further optional variation in the system 10*a*, a panel 29 may be located across the opening 28 in FIG. 11*a* that is shown at approximately the 1 o'clock position. Additionally, in a further variation the opening 28 shown in FIG. 11*a* that is radially adjacent the outer structure 30*a* (and diametrically opposite the panel 29) may be also be blocked off or closed for example by panel like the panel 29.

FIG. 11*b* shows a further processing system 10*b* which is a simpler form of the processing system 10 and may be used for example with a machine for and method of improving nut or fruit orchard hygiene. The processing system 10*b* differs from the processing system 10 shown in FIGS. 1-10 only by way of the omission of the outer structure 30. Therefore, the processing system 10*b* includes the impact mechanism 16, the stationary impact structure/screen arrangement 20, the outer impact elements 50 and the housing 70. As explained in greater detail later in this specification the system 10*b* may be mounted on a piece of agricultural equipment such as a conditioner or a shaker to form a machine that may improve nut or fruit orchard hygiene.

FIGS. 12-15 show yet a further variation of the outer structure designated here as 30*b* (while in use the structure 30*b* will be of an arcuate configuration about the axis 18, here it is shown laid flat for clarity). The outer structure 30*b* here has a textured surface 124. The textured surface 124 can take many forms and in general terms is a surface having a plurality of surface reliefs such as surface valleys, pits or grooves and/or surface elevations such as ridges, ribs, bumps, protrusions and projections; or other irregularities. However, in this embodiment the textured surface 124 comprises a plurality of the valleys 128. At least some of the valleys 128 have two orthogonal axes 130 and 132 of unequal length. A shorter of the orthogonal axes 130 extend in a circumferential direction with respect to the rotation axis 18. A longer of the orthogonal axes 132 extends parallel to the rotation axis 18. Yet in other embodiments the axis 132 can be oblique to the axis of rotation 18. Having the axes 130 and 132 of unequal length provides the valleys 128 with a generally elliptical shape.

Between the valleys 128, the surface 124 as a plurality of lands 134 that are "flat" with respect to the axis of rotation 18 so that every point on the lands 134 lie on respective land radii of the same length. That is, if the surface 124 were laid out flat as indeed shown in FIGS. 12-15 all the lands 134 are flat and lay on a common plane. Also, the valleys 128 have edges 137 that lie on respective edge radii of the same length from the rotation axis 18. Thus, in this configuration the edges 137 all lie on the radii of the same length as the those of the lands 134.

The valleys 128 are arranged in a generally uniform pattern of stacked circumferential rows R1, R2, R3, and R4. In rows R1-R3 the valleys 128 have respective axes 132 of the same length. However, in row R4 the valleys are of the shape of a hemi-ellipse and have a shorter axis 132. The number of rows of valleys on the surface 124 can vary. The ends of the valleys 128 in one row may, as they do in this embodiment, lie between the ends of adjacent valleys in an adjacent row.

Figure 16:
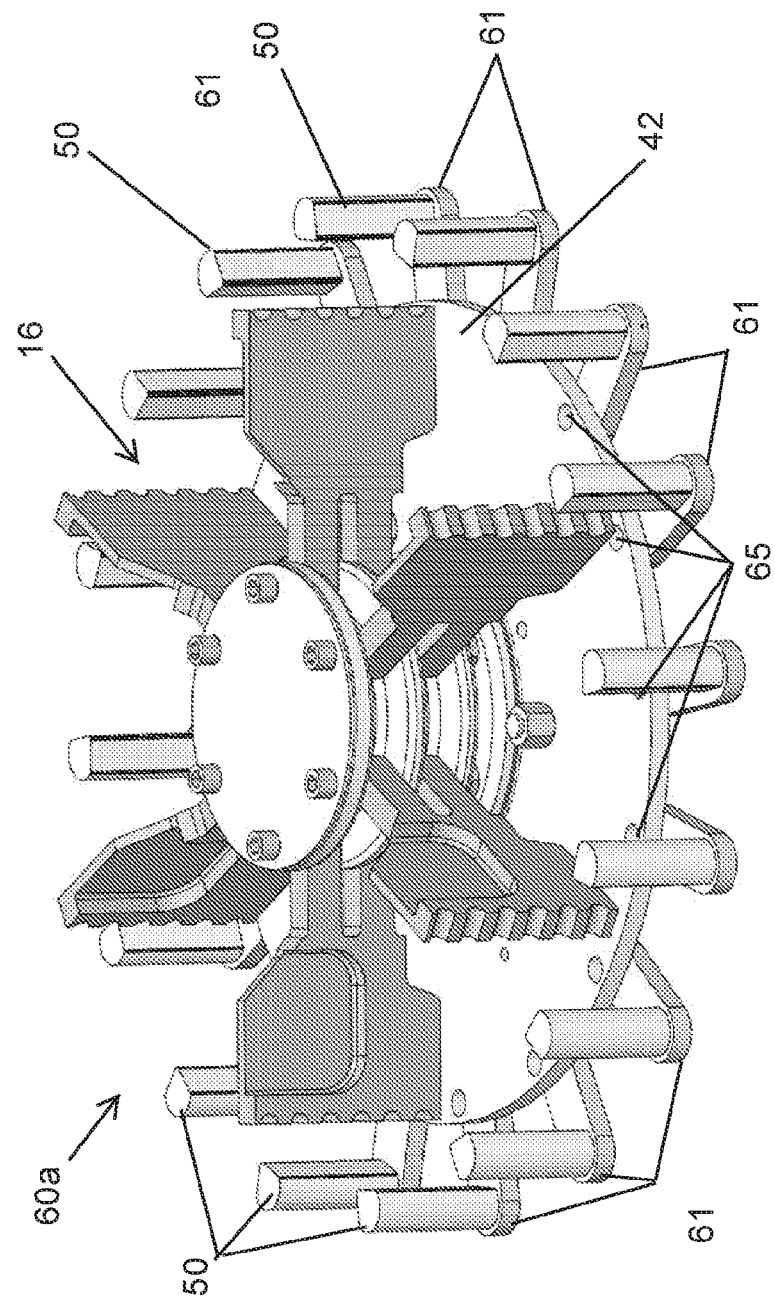
FIG. 16 is a representation of an alternate form of rotor structure that may be incorporated in another embodiment of the disclosed processing system.

FIGS. 16 and 17 show other forms of the impact elements 50 and rotor structure 60 that may be used in any one of the systems 10, 10*a*, 10*b* shown in FIGS. 1-15. FIG. 16 shows a rotor structure 60*a* where the impact elements 50 have the same configuration as described before but are mounted at the end of pivoting cantilever arms 61. The arms 61 are pivotally coupled by pivots 65 to the plate 42. FIG. 17 shows a further variant in the rotor structure 60*b* in which the elements 50 are again of the same configuration as described before but held in a different pivoting arrangement. Here the elements are fixed at opposite end to respective lower and upper arms 61, 63. The arms 61 are coupled by pivots 65 to the plate 42. The upper arms 63 are coupled by pivots 67 to the ring 52. The pivots 65, 67 for each impact element 50 lie on a common axis 69 that is parallel to the rotation axis 18. Thus, here each impact element 50 and its coupled arms 61, 63 form an impact unit that can pivot about respective axes 69.

As result of these variants 60*a* and 60*b*, embodiments of the disclosed system may comprise for example a combination of either one of these variants 60*a*, or 60*b* together with:
 the impact structure 20, outer structure 30, and housing 70 as shown in FIG. 1-10; or
 the impact structure 20, outer structure 30*a* of FIG. 11, together with a housing 70; or
 the impact structure 20 and housing 70 as shown in FIG. 15; or
 the impact structure 20.

Embodiments of the disclosed machine for improving fruit and nut orchard hygiene may comprise a combination of any embodiments of the disclosed system 10, 10*a*, 10*b* and an apparatus for mechanically transferring nuts or fruit from an orchard ground or tree on which the nuts or fruit grow to a processing system. The machine may be self-propelled or towed so that as the machine traverses along the ground the nuts or fruit are transferred to the processing system. Nonlimiting examples of apparatuses for mechanically transferring nuts or fruit from an orchard ground or tree that may be incorporated in the disclosed machine include known apparatuses such as a conditioner or a fruit/nuts harvesting machine or shaker.

A "conditioner" is typically driven from a tractor power take off (PTO) or a tractor's hydraulic system. Self-propelled conditioners with their own power source are also available. Almonds and other material are picked up at the front of the conditioner and travel over sets of chains. The chains help remove soil from the almonds. A fan is used to remove light leaf matter. A wider chain is used to carry stick material into a stick box at the back of the device for disposal at the end of an orchard row. A grader blade is often used in front of the almonds to level the ground and improve the situation for the almond harvester coming through later. The almonds are passed through a hopper onto the freshly graded ground.

In an embodiment of the disclosed machine, embodiments or the system 10, 10*a*, 10*b* are mounted on the conditioner to form the machine. Initially fruit can be shaken or knocked from the tree, and one or more sweepers can be used to bring the nuts into a row between the rows of trees. The machine is traversed along the ground (either under its own power, or by being towed) to pick up unwanted/mummy fruit (including nuts) from the ground and transfer them to embodiments of the system such as systems 10, 10a, 10b which then operate to devitalise and/or and fragment the mummy fruit and other organic matter to the extent to render nuts or fruit from the orchard as unviable or at least less viable as: a habitat or food source for insects; or disease, or a host for disease or fungus.

Figure 19:
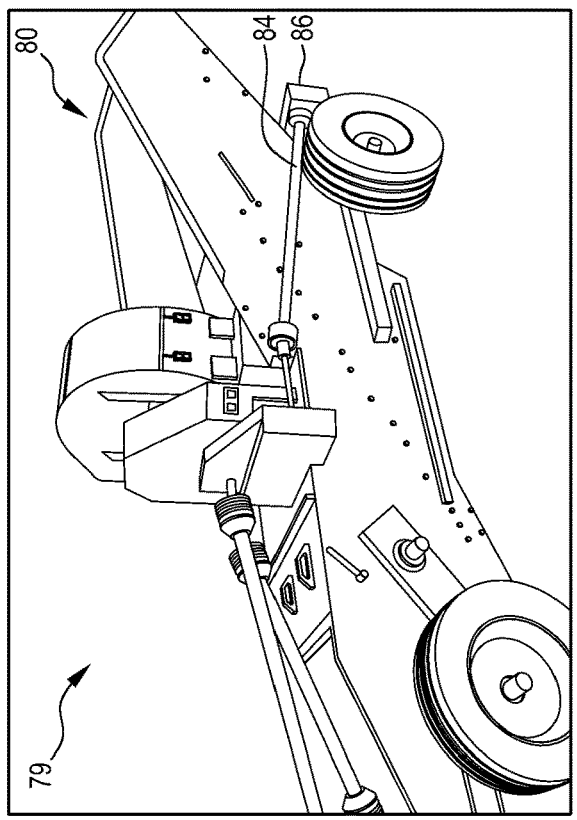
FIG. 19 is a representation from a second angle of the machine shown in FIG. 18.
Figure 18:
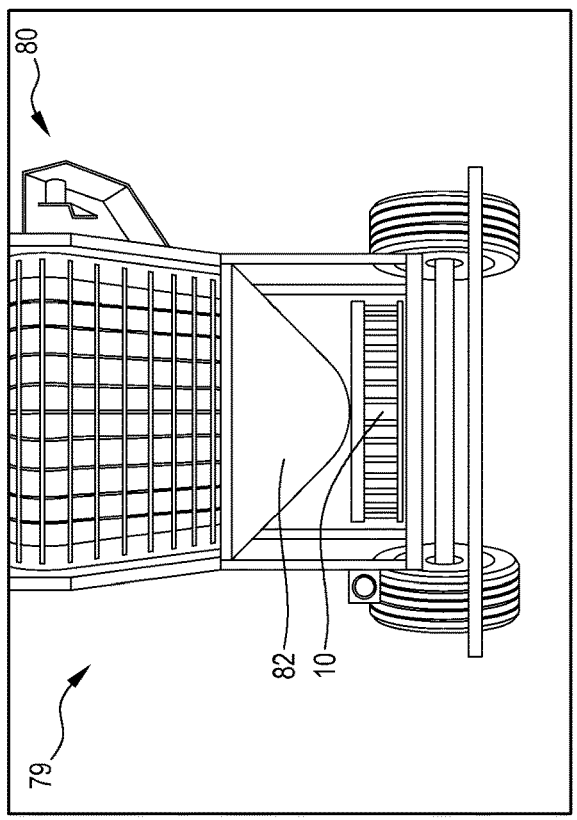
FIG. 18 is a representation from a first angle of the disclosed machine for improving orchard hygiene and comprising a conditioner fitted with an embodiment of the disclosed impact processing system.

FIGS. 18 and 19 shows an embodiment of the machine 79 comprising a conditioner 80 (either self-propelled or towed) with an embodiment of the system 10, 10a, 10b mounted at a location near the almond hopper 82 so that material passing through the hopper 82 can be fed to the system 10. In this embodiment of the machine 79 power from the conditioner 80 is transmitted to the system 10 to enable operation of the system 10. This is done by mechanical coupling to a power take off using a mechanical drive system having a shaft 84, pullies and gear box 86. In alternate embodiments other arrangements for transmitting power are possible including transmitting or otherwise using hydraulic power from the conditioner 80.

A further form of the disclosed machine may comprise the combination of any embodiment of the disclosed system including the specific embodiments of the system 10, 10a, and 10b shown in FIGS. 1-17 (and their described variants) mounted on a machine such as a shake and catch harvester ("shaker") which shakes or otherwise detaches fruit from the tree. Here the machine may comprise the disclosed system including each of the described embodiments, systems 10, 10a, 10b which may be:
  1(a) mounted on the shaker machine;
  1(b) hitched to and a trailing shaker machine; or
  1(c) independently driven behind the shaker; and
  (2) receives the fruit from the shaker for processing such as milling or smashing or fragmenting and depositing on the ground.

The embodiments of the system 10 may also be mounted on, and to receive the waste steam of a shaker including but not limited to an almond shaker/harvester. In these applications the system would act to mill or otherwise smash the waste to minimise the likelihood of fruit entrained in the waste forming a viable host for insects.

It should be appreciated by those skilled in the art that the above facilitates a method of improving nut or fruit orchard hygiene by mechanically transferring nuts or fruit from an orchard ground or tree on which the nuts or fruit grow to embodiments of the system including systems 10, 10a, 10b that operates to fragment or otherwise pulverise the nuts or fruit. As the system is traversed along the ground the fragmented or otherwise pulverise material are deposited in the ground. Any insects that may be in the natural fruit is most likely to be killed by the system 10. Additionally, however and perhaps more significantly the processed fruit and nut is now unviable as a habitat for insects, and in particular the almonds for the Carpophilus beetle.

While a number of specific embodiments have been described it should be appreciated that the system and method may be embodied in many other forms. For example, the impact mechanism 16 may comprises one or more flexible elements (i.e. flails or hammers 34) arranged to impact the material entering the impact zone. Additionally, or alternately the flails or hammers 34 can be connected at one end to the central hub 36 to the central hub in a manner that enables them to flex in the circumferential direction. This would be an alternative to the pivot coupling previously described above. Indeed, in another variation the flails or hammers 34 may be fixed rather than pivoted to the hub 36 and be rigid along their entire length. The impact side of the impact elements 34; and/or the impact members 50; and/or the screen arrangements 20, 30 may be hard faced. In another variation the impact members 50 need not be evenly spaced. Also, the above described method for improving orchard hygiene is not dependent on use of any of the systems 10, 10a, 10b as described above. Such a method may be practiced using alternate, including prior art processing or milling apparatus or machines.

Also, embodiments of the disclosed system and/or a conditioner or other travelling/mobile machine incorporating the disclosed system include any one or more of:
  (a) one or more blockage sensors arranged detect blockage in or reduced mass flow rate of material through the system including one or more sensors at the inlet 12 and/or the outlet 74;
  (b) one or more vibration sensors arranged to sense vibration arising from rotation of the impact mechanism 16 about the rotation axis 18;
  (c) temperature sensors to ensure the safe operation of gearboxes and/or bearings;
  (d) one or more proximity sensors to provide or cause the generation of an alarm when a person is within a designated distance of the system 10. Such sensors may also be arranged to directly or indirectly activate a light and/or an audible signal generator to indicated or otherwise show that the system 10 is still rotating thereby alert the person that machine is not safe to work on;
  (e) one or more torque sensors arranged to provide a signal indicative of torque or load applied to a drive shaft of the impact mechanism 16.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the apparatus and method as disclosed herein.

What is claimed is:

1. A machine for improving nut or fruit orchard hygiene comprising: a mechanism for mechanically transferring nuts or fruit from an orchard ground or tree on which the nuts or fruit grow to an impact processing system, wherein the impact processing system is operable to fragment or otherwise pulverise the nuts or fruit, the impact processing system comprising:
  a housing;
  a central feed opening enabling material flow into a primary impact zone of the impact processing system;
  an impact mechanism disposed in the primary impact zone and arranged to be rotatable about a rotation axis;
  an impact structure disposed about the impact mechanism the impact structure being provided with a plurality of holes;
  an outer structure radially spaced from the impact structure wherein the outer structure is formed of one or more segments wherein the one or more segments cumulatively extend about the axis of rotation for any angle from 30° to 270° inclusive wherein the outer structure does not completely encircle the impact structure;

wherein the impact mechanism, the impact structure and the outer structure are located within the housing; and wherein the rotatable impact mechanism are arranged to impact material entering the primary impact zone from the central opening and accelerate the impacted material in a radial outward direction toward the impact structure to effect fragmentation of the impacted material wherein the fragmented material is able to pass through the holes in the impact structure.

2. The machine according to claim 1 further comprising a power source enabling the machine to be self-propelled across the ground and wherein the impact processing system is traversed along the ground while the nuts or fruit are transferred to the impact processing system.

3. The machine according to claim 2 wherein the impact processing system is coupled to the power source enabling the impact processing system to process the nuts or fruit.

4. The machine according to claim 1 wherein the impact mechanism is arranged to receive power from a powered vehicle used to tow the machine.

5. A method of improving nut or fruit orchard hygiene comprising:
    mechanically transferring nuts or fruit from an orchard ground or tree on which the nuts or fruit grow to an impact processing system;
    operating the impact processing system to fragment or otherwise pulverise the nuts or fruit;
    wherein the impact processing system is traversed along the ground while the nuts or fruit are transferred to the impact processing system; and
    depositing the nuts or fruit onto the ground after passage through the impact processing system.

6. The method according to claim 5 comprising mounting the impact processing system on a machine wherein the machine comprises a mechanism to mechanically transfer the fruit or nuts to the impact processing system; and transmitting power from the machine to the impact processing system to enable operation of the impact processing system.

7. The method according to claim 5 comprising mounting the impact processing system on a machine wherein the machine comprises a mechanism to mechanically transfer the fruit or nuts to the impact processing system; and towing the machine and the impact processing system behind a vehicle.

8. The method according to claim 5 wherein mechanically transferring the nuts comprises either picking up fruit or nuts off the ground; or, shaking and catching fruit or nuts from a tree.

9. A method of improving nut or fruit orchard hygiene comprising:
    mechanically transferring nuts or fruit from an orchard ground or tree on which the nuts or fruit grow to an impact processing system;
    operating the impact processing system to fragment or otherwise pulverise the nuts or fruit;
    wherein the impact processing system is traversed along the ground while the nuts or fruit are transferred to the impact processing system, and
    wherein the impact processing system comprises:
    a housing;
    a central feed opening enabling material flow into a primary impact zone of the impact processing system;
    an impact mechanism disposed in the primary impact zone and arranged to be rotatable about a rotation axis;
    an impact structure disposed about the impact mechanism the impact structure being provided with a plurality of holes;
    an outer structure radially spaced from the impact structure wherein the outer structure is formed of one or more segments wherein the one or more segments cumulatively extend about the axis of rotation for any angle from 30° to 270° inclusive wherein the outer structure does not completely encircle the impact structure;
    wherein the impact mechanism, the impact structure and the outer structure are located within the housing; and
    the rotatable impact mechanism being arranged to impact material entering the primary impact zone from the central opening and accelerate the impacted material in a radial outward direction toward the impact structure to effect fragmentation of the impacted material wherein the fragmented material is able to pass through the holes in the impact structure.

10. An impact processing system comprising:
    a housing;
    a central feed opening enabling material flow into a primary impact zone of the impact processing system;
    an impact mechanism disposed in the primary impact zone and arranged to be rotatable about a rotation axis;
    an impact structure disposed about the impact mechanism the impact structure being provided with a plurality of holes;
    an outer structure radially spaced from the impact structure wherein the outer structure is formed of one or more segments wherein the one or more segments cumulatively extend about the axis of rotation for any angle from 30° to 270° inclusive wherein the outer structure does not completely encircle the impact structure;
    the impact mechanism, the impact structure and the outer structure located within the housing; and
    the rotatable impact mechanism being arranged to impact material entering the primary impact zone from the central opening and accelerate the impacted material in a radial outward direction toward the impact structure to effect fragmentation of the impacted material wherein the fragmented material is able to pass through the holes in the impact structure.

11. The impact processing system according to claim 10 wherein the impact structure is provided with one or more gaps dimensioned to enable passage of incompressible objects or impacted material too large to otherwise pass through the holes in the impact structure.

12. The impact processing system according to claim 11 wherein the outer structure is located so that material passing through the one or more gaps impacts the outer structure.

13. The impact processing system according to claim 10 wherein the impact structure is provided with a single gap and the outer structure extends for an angle of about 180°.

14. The impact processing system according to claim 10 comprising a set of impact members arranged to be rotatable about the rotation axis and located outside of the impact structure wherein at least a proportion of the material passing through the holes or gaps of the impact structure are impacted by and/or accelerated in a radial outer direction by the set of impact members.

15. The impact processing system according to claim 14 wherein the impact members comprise bars or rods arranged to pivot about respective axes radially spaced from the rotation axis.

16. The impact processing system according to claim 15 comprising a plate on which the impact mechanism and the set of impact members are coupled.

17. An impact processing system comprising:
a housing;
a central feed opening enabling material flow into a primary impact zone of the impact processing system;
an impact mechanism disposed in the primary impact zone and arranged to be rotatable about a rotation axis;
an impact structure disposed about the impact mechanism the impact structure being provided with a plurality of holes;
an outer structure radially spaced from the impact structure wherein the outer structure is formed of one or more segments wherein the one or more segments cumulatively extend about the axis of rotation for any angle from 30° to 270° inclusive wherein the outer structure does not completely encircle the impact structure;
the impact mechanism, the impact structure and the outer structure located within the housing; and
the rotatable impact mechanism being arranged to impact material entering the primary impact zone from the central opening and accelerate the impacted material in a radial outward direction toward the impact structure to effect fragmentation of the impacted material wherein the fragmented material is able to pass through the holes in the impact structure;
a rotatable set of impact members arranged outside of the impact structure wherein at least a proportion of the material passing through the holes or gaps of the impact structure are impacted by and/or accelerated in a radial outer direction by the set of impact members;
wherein the impact members comprise bars or rods arranged to pivot relative to the axis of rotation;
a plate on which the impact mechanism and the set of impact members are coupled; and
a plurality of arms pivotally coupled to the plate and wherein each impact member is connected to a respective arm.

18. The impact processing system according to claim 17 wherein the outer structure comprises an impervious surface.

* * * * *